(12) United States Patent
Miksovsky et al.

(10) Patent No.: US 10,625,908 B2
(45) Date of Patent: Apr. 21, 2020

(54) TRAVEL TUBE

(71) Applicant: humangear, inc., San Francisco, CA (US)

(72) Inventors: Christopher A. Miksovsky, San Francisco, CA (US); Thomas W. Zipprian, San Francisco, CA (US); Scott D. Cook, Oakland, CA (US); Clint N. Slone, San Francisco, CA (US)

(73) Assignee: humangear, Inc., San Francisco, CA (US)

( * ) Notice: Subject to any disclaimer, the term of this patent is extended or adjusted under 35 U.S.C. 154(b) by 103 days.

(21) Appl. No.: 15/943,308

(22) Filed: Apr. 2, 2018

(65) Prior Publication Data
US 2018/0282026 A1    Oct. 4, 2018

Related U.S. Application Data

(60) Provisional application No. 62/481,032, filed on Apr. 3, 2017.

(51) Int. Cl.
*B65D 51/18* (2006.01)
*B65D 35/44* (2006.01)
(Continued)

(52) U.S. Cl.
CPC ............. *B65D 35/44* (2013.01); *A45D 34/00* (2013.01); *B65D 35/12* (2013.01);
(Continued)

(58) Field of Classification Search
CPC ...... B65D 35/44; B65D 35/12; B65D 51/242; B65D 41/0428; B65D 2255/00; A47J 41/0011; A45D 34/00; Y02W 30/807
(Continued)

(56) References Cited

U.S. PATENT DOCUMENTS

D612,263 S    3/2010  Miksovsky
D612,264 S    3/2010  Miksovsky
(Continued)

FOREIGN PATENT DOCUMENTS

GB    4030007    5/2013
GB    4030008    5/2013
(Continued)

OTHER PUBLICATIONS

International Search Report and Written Opinion dated Jul. 11, 2018 from International Application No. PCT/US2018/025412.
(Continued)

*Primary Examiner* — Elizabeth J Volz
(74) *Attorney, Agent, or Firm* — Beyer Law Group LLP

(57) ABSTRACT

A reusable travel tube that has a flexible tube portion, a collar and a cap that can be threaded onto the cap. The collar is fitted over a neck of the tube portion and forms a gasket-like seal between the neck of the tube portion and the collar. The cap has a rotatable locking bail that can prevent a flip-top cap from accidentally being opened. When the locking bail is not positioned to prevent the cap from being accidentally opened, it can be retracted into a nested position such that the handle of the bail is substantially flush with the outer side surface of the collar.

20 Claims, 10 Drawing Sheets

(51) Int. Cl.
*A45D 34/00* (2006.01)
*B65D 35/12* (2006.01)
*B65D 41/04* (2006.01)
*B65D 47/08* (2006.01)

(52) U.S. Cl.
CPC ......... *B65D 41/0428* (2013.01); *B65D 47/08* (2013.01); *B65D 2251/1016* (2013.01); *B65D 2255/00* (2013.01); *Y02W 30/807* (2015.05)

(58) Field of Classification Search
USPC ............. 220/254.3, 756, 760, 315, 322, 324
See application file for complete search history.

(56) References Cited

U.S. PATENT DOCUMENTS

| D612,741 S | 3/2010 | Miksovsky |
| 2007/0205176 A1 | 9/2007 | Karp |
| 2012/0145713 A1* | 6/2012 | Jung ................... A47J 41/0011 |
| | | 220/254.3 |

FOREIGN PATENT DOCUMENTS

| GB | 4030009 | 5/2013 |
| WO | WO 2008/029585 | 3/2008 |

OTHER PUBLICATIONS

Nalgene, "On The Fly", http://www.nalgene.com/bottles/on-the-fly/, downloaded from the internet on Jul. 18, 2017.
Specialty Bottle, "Swing Top Bail Jars", https://www.specialtybottle.com/glass-jars/bale-swing-top, downloaded from the internet Jun. 21, 2018.
Lock & Lock, "Lock&Lock Classic", http://www.locknlock.com/eng/productbrand, downloaded from the internet Jun. 21, 2018.
Miksovsky et al., Design U.S. Appl. No. 29/599,448, filed Apr. 3, 2017.
Miksovsky et al., Design U.S. Appl. No. 29/599,446, filed Apr. 3, 2017.
Miksovsky et al., Design U.S. Appl. No. 29/441,679, filed Jan. 8, 2013.
Hydroflask, "Hydration", https://www.hydroflask.com/hydration, downloaded from the internet on Jul. 18, 2017.
Bormioli Rocco, "Giara Clear Glass Bottle with Stopper", https://www.amazon.com/Bormioli-Rocco-Giara-Bottle-Stopper/dp/B003QZPY6Q, downloaded from the internet on Jul. 18, 2017.

* cited by examiner

TRAVEL TUBE

RELATED APPLICATIONS

This application claims the benefit of U.S. Provisional Patent Application No. 62/481,032 filed on Apr. 3, 2017. This application is also related to U.S. Design application Nos. 29/599,448 and 29/599,446, both filed on Apr. 3, 2017. All of the foregoing applications are hereby incorporated herein by reference for all purposes.

BACKGROUND OF THE INVENTION

The present invention relates generally to travel bottles. More particularly, the invention relates to reusable, squeezable tubes for storing and dispensing toiletries or foods and suitable for transport.

Containers are used to store food and toiletries, such as lotion and sunscreen. Often such containers are used to hold toiletries for travel. Typical travel containers are formed of rigid plastic and are often intended to be used only one time. Although these plastic travel containers are capable of storing and even dispensing viscous fluids, there are continuing efforts to develop new containers that are reusable and provide improved function and convenience.

SUMMARY OF THE INVENTION

In accordance with an embodiment, a reusable travel tube is provided. The travel tube includes a flexible tube portion, a collar, and a cap. The flexible tube portion has a neck with a flange. The collar fits over and surrounds the neck of the tube portion and the flange fits over a top rim of the collar. The cap is configured to be screwed onto the collar via a threaded portion of the collar.

In accordance with another embodiment, a cap system is provided for use with a reusable travel tube. The cap system includes a collar and a flip-top cap. The collar fits over and surrounds the neck of the reusable travel tube. The collar includes a rotatable locking bail. The flip-top cap is configured to be screwed onto the collar via a threaded portion of the collar. The rotatable locking bail prevents the flip-top cap from opening.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE EMBODIMENTS

Figure 1:
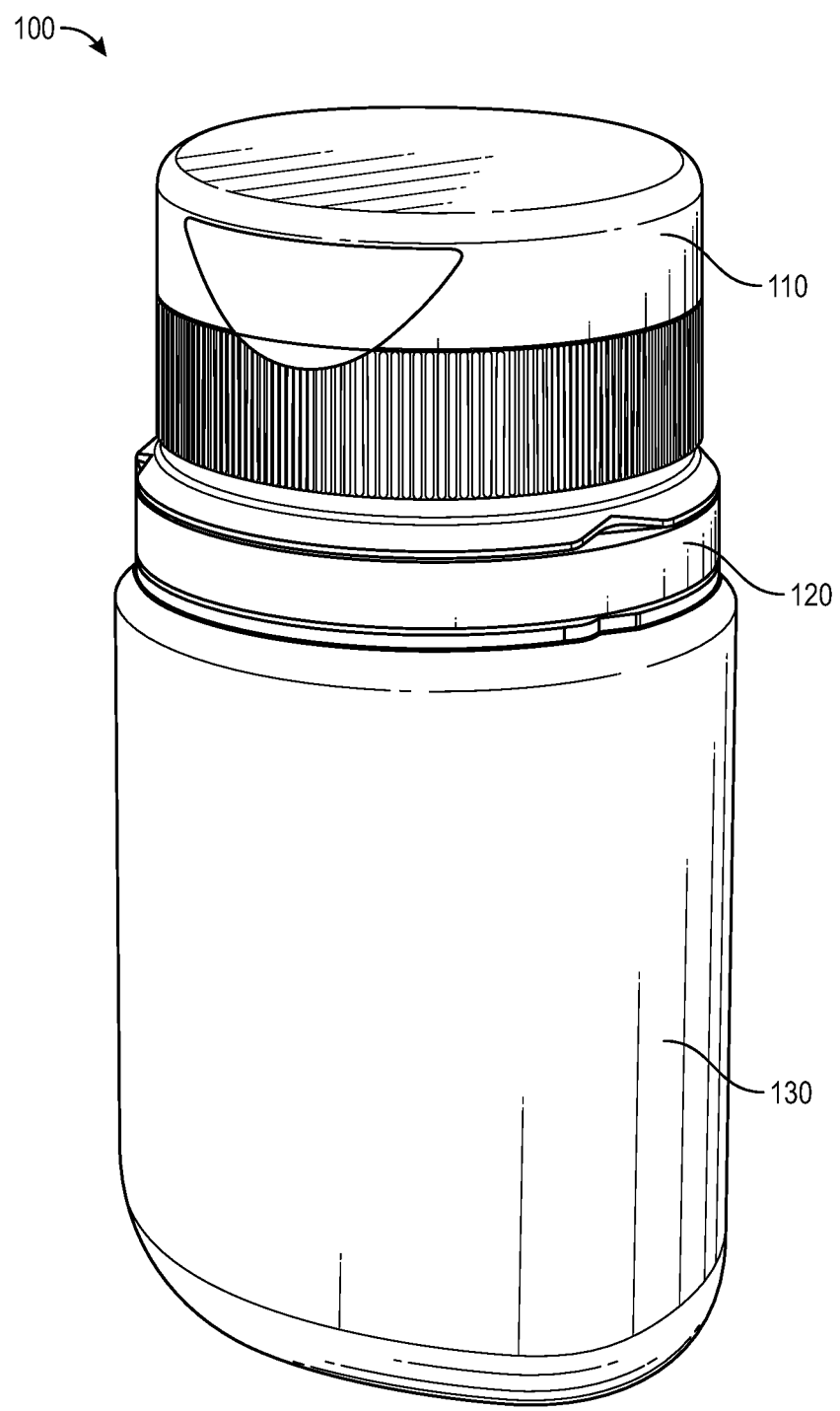
FIG. 1 is a perspective view of a travel tube in accordance with an embodiment.

The present invention relates generally to travel bottles. More particularly, the invention relates to reusable, squeezable tubes for storing and dispensing toiletries or foods and suitable for transport.

Referring to FIGS. 1-8, a reusable, squeezable travel tube will be described. According to an embodiment, the travel 100 includes a cap 110, collar 120, and silicone tube portion 130. The collar 120 includes a locking bail mechanism 122 to prevent the cap 110 from accidentally opening and leaking contents of the travel tube 100. Additionally, the locking bail 12 can serve as a fixture point for a clip, hook or other tether. When not being used to lock the cap 110 in place, the locking bail 122 can be retracted into a low-profile nested position on the collar 120.

Figure 2:
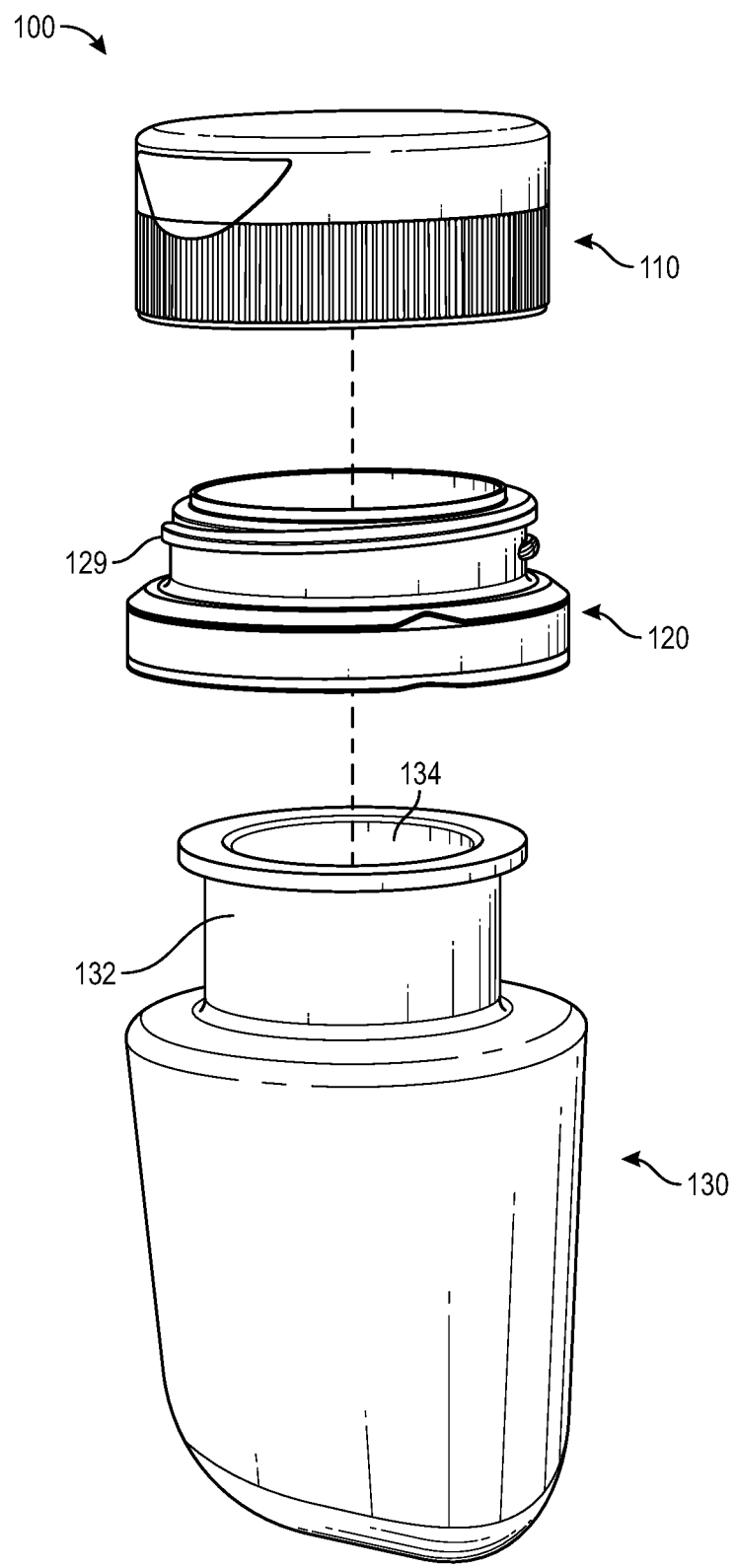
FIG. 2 is an exploded perspective view of the embodiment of the travel tube shown in FIG. 1, with the bail in the nested position.
Figure 6A:
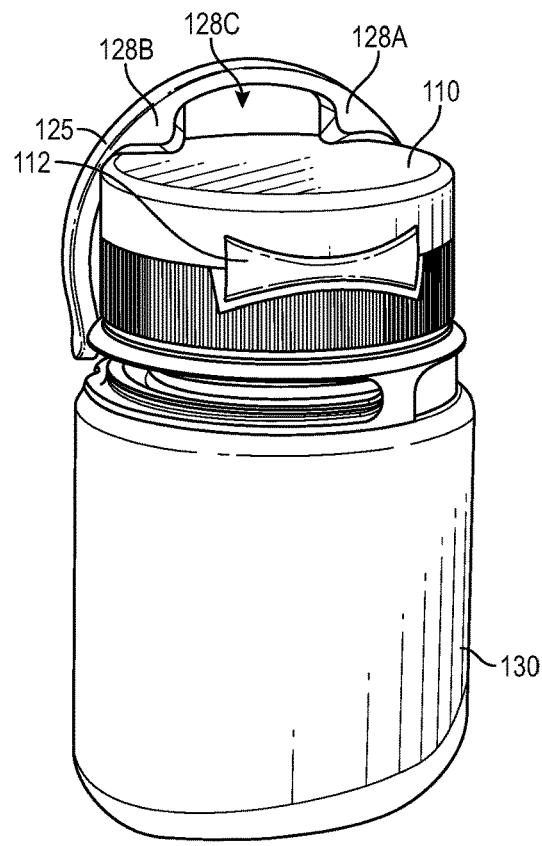
FIGS. 6A and 6B show the embodiment of the travel tube with the bail in the locked position.
Figure 6B:
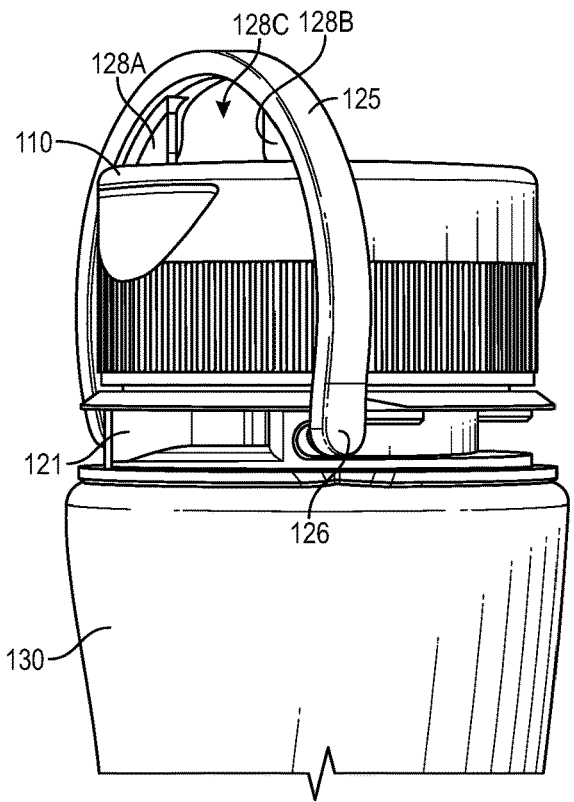

FIG. 1 is a perspective view of the squeezable travel tube 100 in accordance with an embodiment. The travel tube 100 includes a squeezable, flexible tube portion 110 that is fitted with a collar 120. As shown in the exploded perspective view of FIG. 2 and explained in further detail below, the collar 120 is fitted over and secured to the neck portion 132 of the tube portion 130. An opening 134 at the neck portion 132 allows the tube 100 to be refilled and cleaned. As shown in FIG. 2, the collar 120 is provided with a threaded portion 129 that corresponds to a threaded portion (not shown) in the cap 110 such that the cap 110 can be screwed onto the collar 120 to assemble the travel tube 100. According to an embodiment, the threaded portion 129 is oriented such that, when the cap 110 is screwed onto the collar 120 and tightened, the cap 110 is preferably oriented as shown in FIGS. 6A and 6B, with the hinge 112 on the side of the cap 110 preferably opposite the bail 122.

As shown in FIGS. 1 and 2, the cap 110 can be a flip-top cap with a small opening through which viscous fluid may be squeezed in a controlled manner from the tube portion 130. According to other embodiments, the cap can be a simple screw-on cap. The opening 134 at the relatively wide mouth of the tube portion 130 and collar 120 allow easy filling and washing of the tube portion 110. With the relatively small opening (not shown) of a flip top cap 110, dispensing of the fluid from the tube 100 can be easily controlled by a user.

Figure 3:
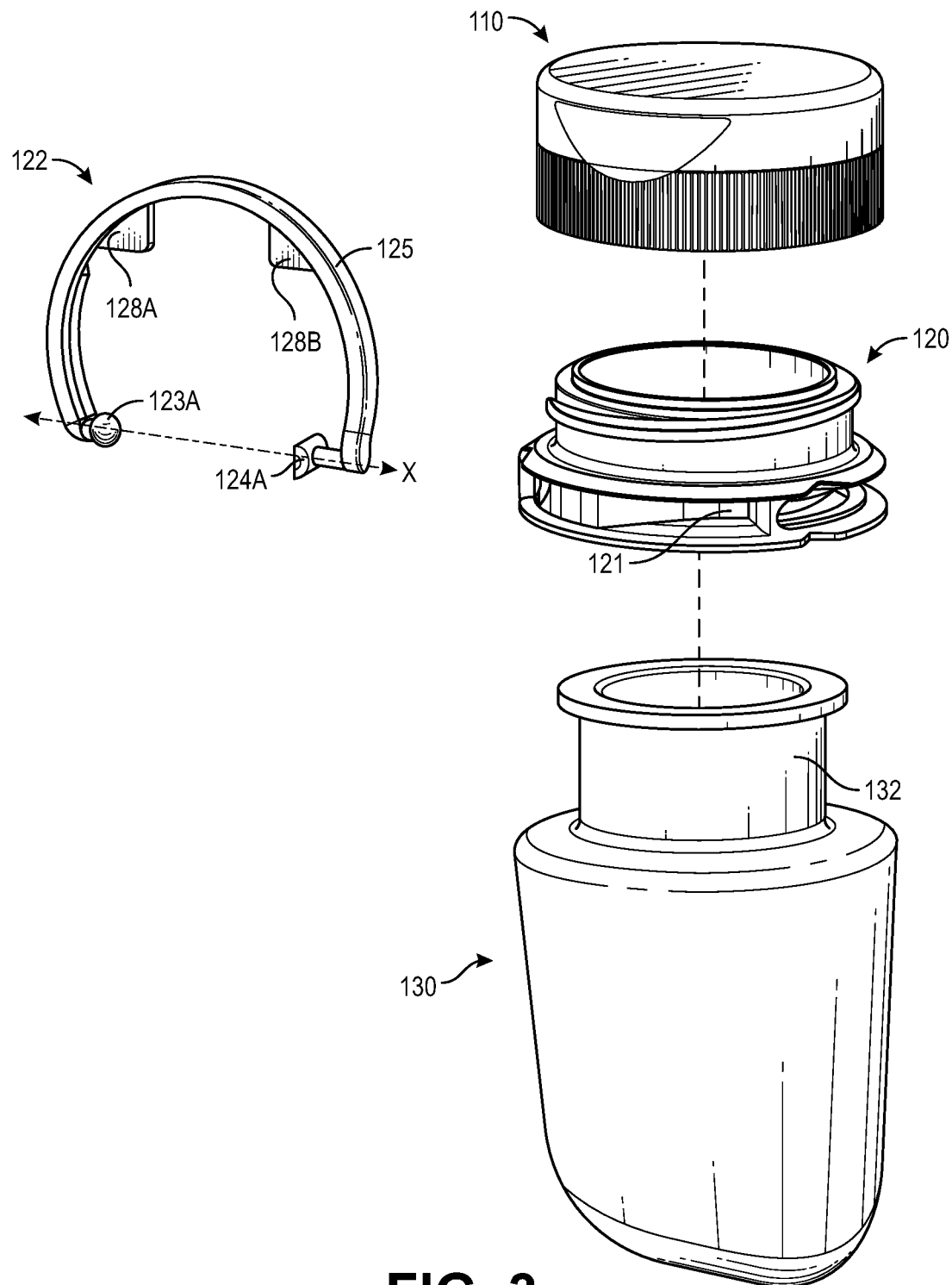
FIG. 3 is another exploded perspective view of the embodiment of the travel tube shown in FIG. 1.

FIG. 3 is an exploded view of the travel tube 100, showing the cap 110, the collar 120, and the tube portion 130. The exploded view of FIG. 3 shows an additional feature of the collar 120: a retractable locking bail 122, which is attached to the collar 120 and described in more detail below. As noted above, the cap 110 is screwed onto the collar 120 via the threaded portion 129 on the collar 120 and a corresponding threaded portion (not shown) in the cap 110.

The collar 120 is attached to the tube portion 130 by fitting the collar 120 over the neck 132 of the tube portion 130. FIG. 4 is a detailed cross-sectional view of the neck 132. As shown in FIG. 4, the neck 134 has a flange 136 that has a tooth 138 on its end. The flange 136 is substantially perpendicular to the body of the neck 134 and the tooth 138 extends down from the flange at a substantially perpendicular angle. The side of the tooth 138 is thus substantially parallel to the side of the neck 134. The flange 136 has a thickness T that is preferably in a range of about 0.75-3 mm, and more preferably about 1.2 mm. It will be understood that this thickness T is the thickness of the flange 136 in an uncompressed state, as when the cap 110 is tightened onto the collar 120, the flange 136 is compressed and the thickness T is therefore smaller. The tooth 138 has a width W preferably in a range of about 1-3.5 mm, and more preferably about 1.5 mm. The height H of the tooth 138 is preferably in a range of about 1.5-3.5 mm, and more preferably about 2.15 mm According to an embodiment, the tube portion 130 is formed of a flexible silicone material (which can be compressed) and the collar 120 is formed of a substantially rigid polypropylene material.

Figure 4A:
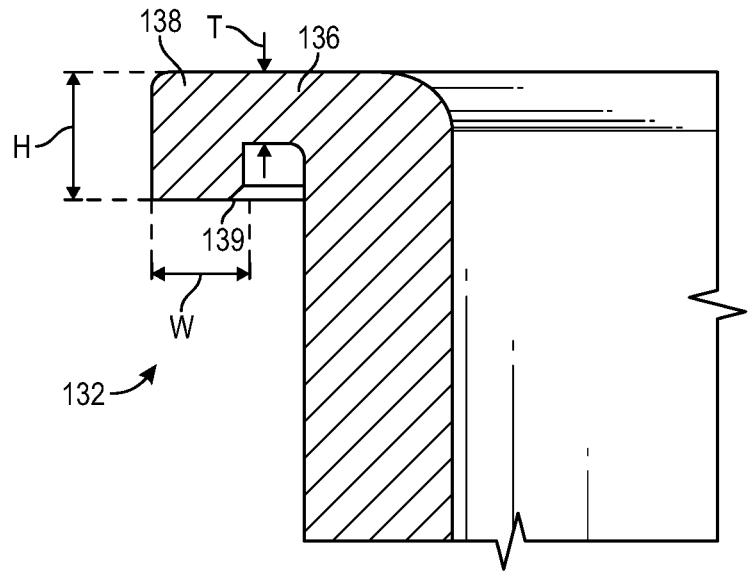
FIG. 4A is a side cross-sectional view of the neck of the tube portion of the embodiment shown in FIGS. 1-3.
Figure 4B:
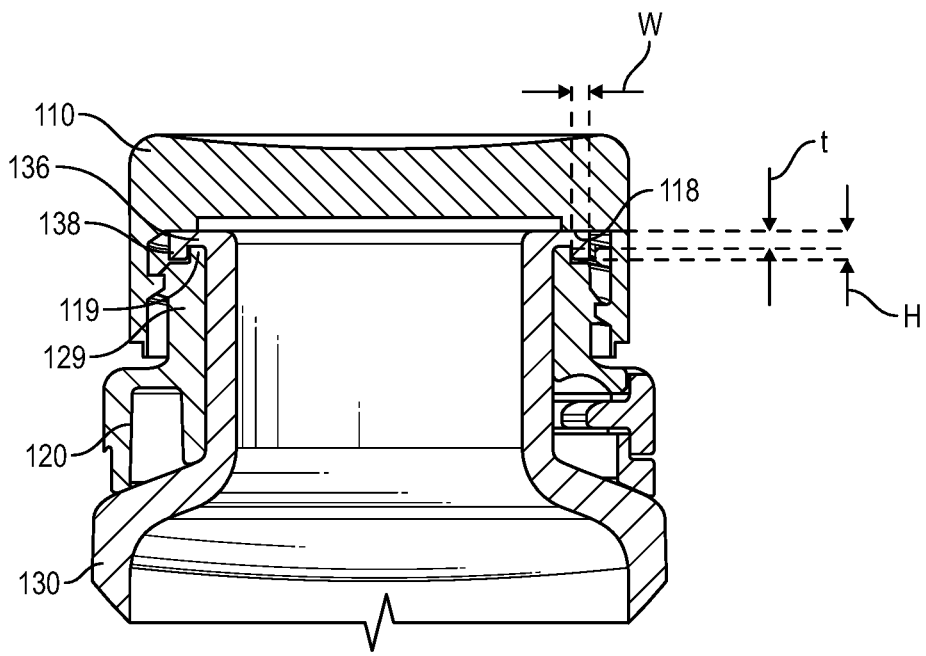
FIG. 4B is a side cross-sectional view of the cap, collar, and tube portion assembled together.

The dimensions of the neck 132 allow a strong gasket-like seal between the tube portion 130 and the collar 120 when the collar 120 is fitted over the neck portion 132. FIG. 4B also shows a sealing surface 118 of the cap 110. The distance between the sealing surface 118 of the cap 110 and the top surface of the top rim 119 of the collar 120 is the post-tightening thickness t, as shown in FIG. 4B. As noted above, the flange 136 is compressed when the cap 110 is tightened onto the collar 120. Thus, with the height H and width W of the tooth 138 both larger than the thickness T (and especially the post-tightening thickness t), a tight gasket-like seal is achieved.

FIG. 4B is a side cross-sectional view of the cap 110, collar 120, and tube portion 130 assembled together. As shown in FIG. 4B, the flange 136 is above the top rim 119 of the collar 120 with the tooth 138 abutting the outer surface of the collar 120. FIG. 4B shows that the tooth 138 surrounds the outer surface of the collar 120 above the threaded portion 129. The top rim 119 of the collar 120 fits within the void between the flange 136, the tooth 138, and the body of the tube portion 130. FIG. 4A shows a chamfered lower edge 139 of the tooth 138 facing the body of the tube portion 130. The chamfered lower edge 139 makes it easier to fit the flange 136 and tooth 138 over the top rim 119 of the collar 120.

Figure 4C:
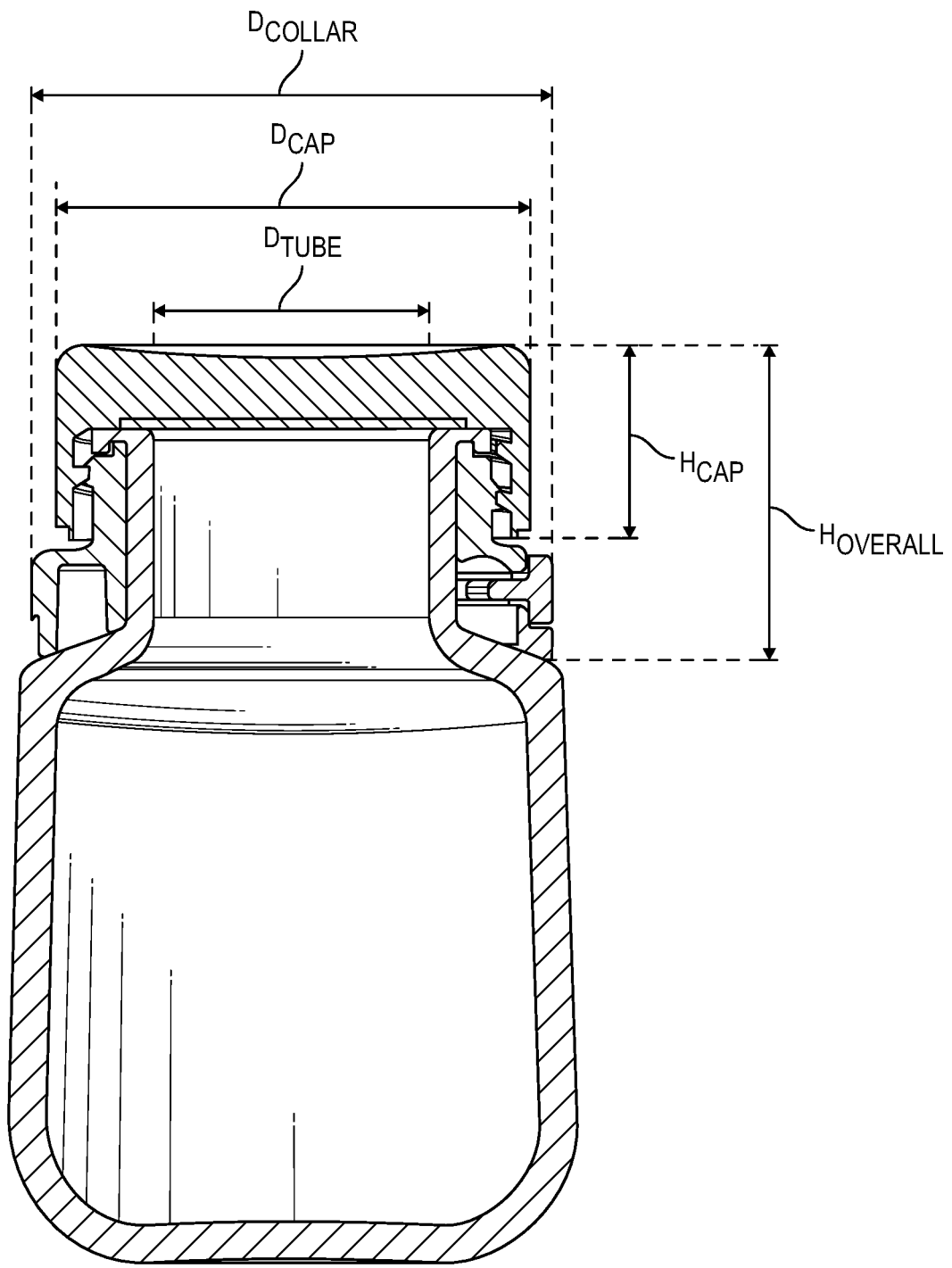
FIG. 4C is a side cross-sectional view of the cap, collar and tube portion assembled together, showing relative dimensions of the cap and collar.

FIG. 4C shows relative dimensions of the cap 110 and collar 120. The diameter $D_{cap}$ of the cap 110 is preferably wider than the overall height $H_{overall}$ of the cap 110 and collar 120. Preferably, the ratio of the overall height $H_{overall}$ of the cap 110 and collar 120 to the diameter $D_{cap}$ of the cap 110 is 0.75 or less. According to an embodiment, the diameter $D_{cap}$ of the cap 110 is about 41 mm and the overall height $H_{overall}$ of the cap 110 and collar 120 is about 27.4 mm. In this embodiment, the diameter $D_{collar}$ of the collar 120 is a bit wider, at about 45 mm and the inner diameter $D_{tube}$ of the tube 130 is about 24 mm. The ratio of the inner diameter $D_{tube}$ of the tube 130 to the overall height $H_{overall}$ of the cap 110 and collar 120 is preferably 0.75 or greater. In this embodiment, the height $H_{cap}$ of the cap 110 is about 16.75 mm. The ratio of the inner diameter $D_{tube}$ of the tube 130 to the height $H_{cap}$ of the cap 110 is preferably at least about 1.25. According to an embodiment, the height $H_{CollarVis}$ (not shown) of the visible collar 120 with the cap 110 screwed on is about 10.5 mm. The ratio of the height $H_{CollarVis}$ to the inner diameter $D_{tube}$ of the tube 130 is preferably about 0.55 or less. The ratio of the height $H_{CollarVis}$ to the diameter $D_{cap}$ of the cap 110 is preferably about 0.3 or less. The ratio of the height $H_{CollarVis}$ to the diameter $D_{collar}$ of the collar 120 is also preferably about 0.3 or less.

The locking bail 122 can be pulled out, stretched momentarily, and positioned in the locked position, as shown in FIGS. 6A and 6B, to lock the cap 110 in a closed position. In the locked position, the teeth 128A, 128B of the locking bail 122 push against the top of the cap 110 to prevent flip top position of the cap 110 from accidentally being flipped open or from being opened due to internal pressure. As shown in FIGS. 6A and 6B, the teeth 128A, 128B, in the locked position, are positioned to push down against the top of the cap 110 preferably closer to the side opposite the hinge 112 to prevent the cap 110 from being accidentally flipped open, or from being opened due to internal pressure. Thus, the locking teeth 128A, 128B have more locking ability/leverage on the cap 110 by being further away from the hinge 112. The teeth 128A, 128B are able to remain in the locked position because the some additional force is needed to stretch the handle 125, or for the teeth 128A, 128B to bend momentarily, in order for the teeth 128A, 128B to slide up and over the edge of the top of the cap 110 to disengage the teeth 128A, 128B (and bail 122) from the top of the cap 110. As shown in FIGS. 6A and 6B, there is a recess 128C between the teeth 128A, 128B. This recess 128C allows the bail 122 to be clipped or tethered even while it is in the locked position. In some embodiments, there is only one tooth extending from the handle 125 for pushing down on the cap 110 in the locked position.

Figure 5A:
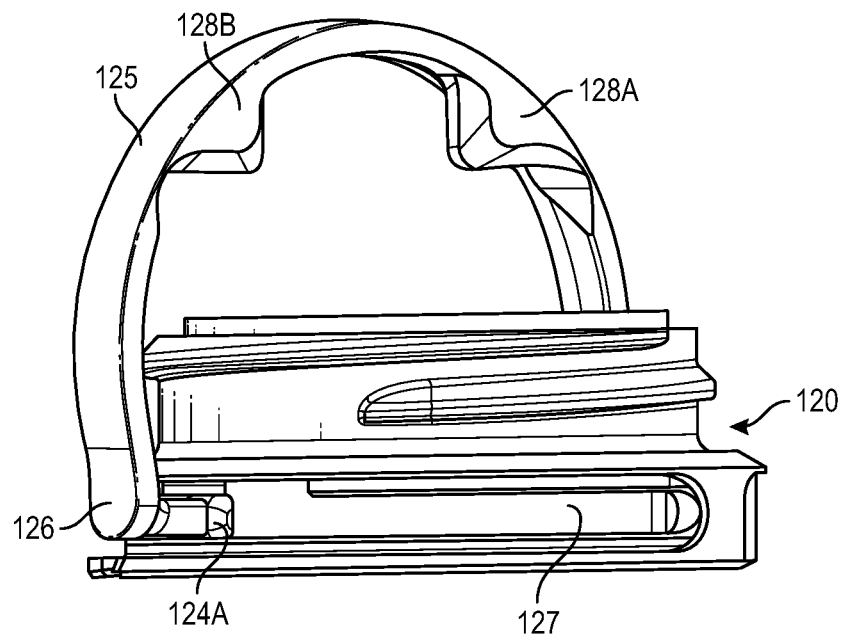
FIG. 5A is a perspective view of the collar of the embodiment shown in FIGS. 1-3.
Figure 5B:
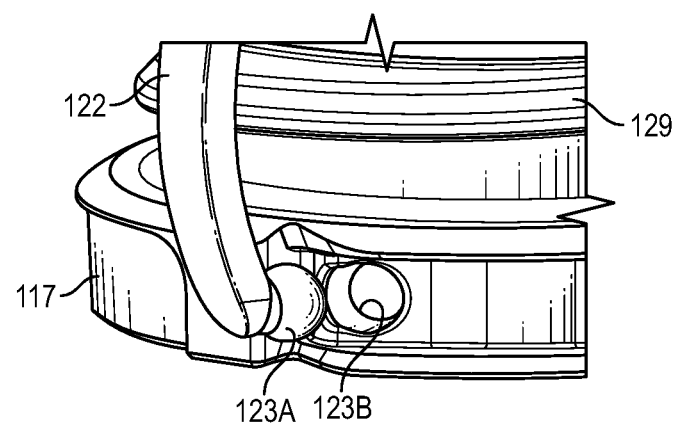
FIG. 5B is a close up view of the ball and socket feature for attaching the bail shown in FIG. 5A.

The locking bail 122 is attached to the collar 120 by a ball and socket joint 123 at one end on one side of the collar 120 and a flared pin joint 124 at the other end on the other side of the collar 120. As shown in FIG. 5B, a ball 123A at one end of the handle 125 is fitted within a corresponding socket 123B in the collar 120. A flared pin 124A at the other end of the handle 125 is fitted within a slot 127 in the side wall of the collar 120 such that the flared pin 124A is secured within and slidable along the slot 127, as shown in FIG. 5A. In the nested position, flared the pin 124A fits within a correspondingly shaped space 124B at one end of the slot 127. It will be understood that the curvature of the handle 125 corresponds substantially to the curvature of the collar 120. This can be seen when the bail 122 is in the nested position, as shown in FIG. 7A.

As shown in FIG. 5B, the collar 120 can have a label area 117, which is a textured area at the base of the collar 120. The label area 117 is slightly textured to allow a user to write on the area 117 to, for example label/identify the contents or to write the user's name. The label area 117 is slightly recessed to prevent the label from being rubbed off or smudged.

Figure 7A:
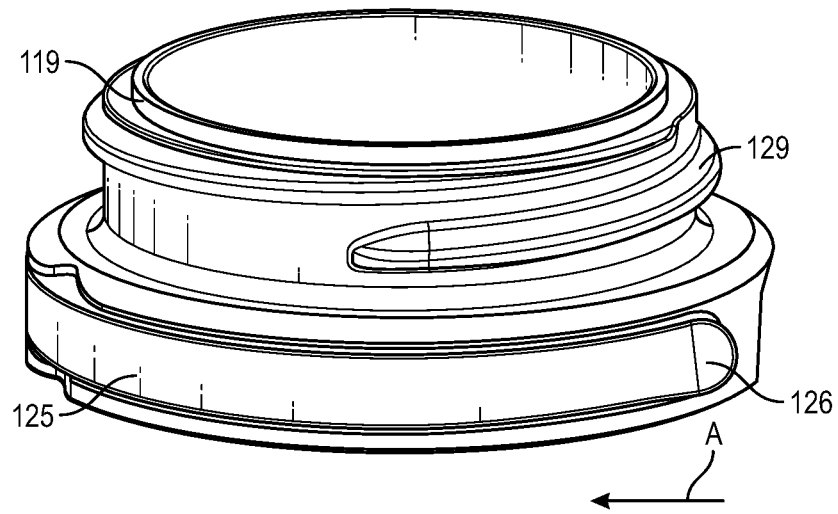
FIGS. 7A-7C show the operation of the locking bail in accordance with an embodiment.
Figure 7B:
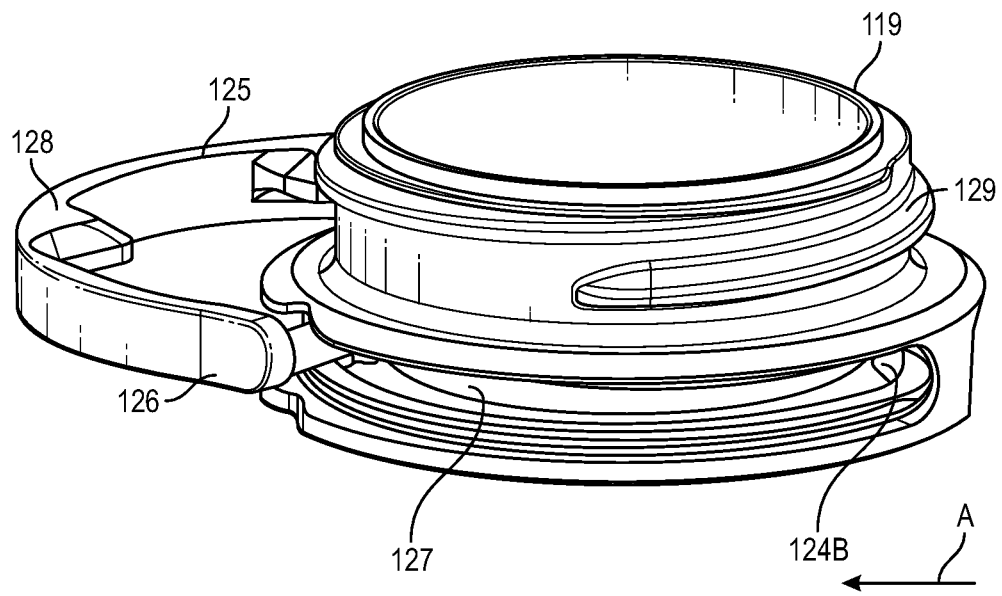

As shown in FIG. 7A, a tab 126, which flares outward, is positioned at one end of the handle 125 opposite the flared pin 124A. When the bail 122 is in the nested position and a user pushes on the tab 126 in the direction of arrow A, the flared pin 124A slides along the slot 127 in the direction of arrow A until it reaches the other end of the slot 127, as shown in FIG. 7B. FIGS. 6A and 6B also show the flared pin 124A at the other end of the slot 127. The bail 122 stretches a bit as the flared pin 124A is slid along the slot 127 and snaps into an extended position when the flared pin 124A reaches the other end of the slot 127. The bail 122 also snaps into the nested position, as the bail 122 is in a relaxed state in the fully nested position and the extended position (when the flared pin 124A is at the other end of the slot 127). In-between those two states, the bail 122 is stretched (most stretched at mid-point between nested and extended). The bail 122 is preferably formed of a polypropylene or polyamide material.

Figure 7C:
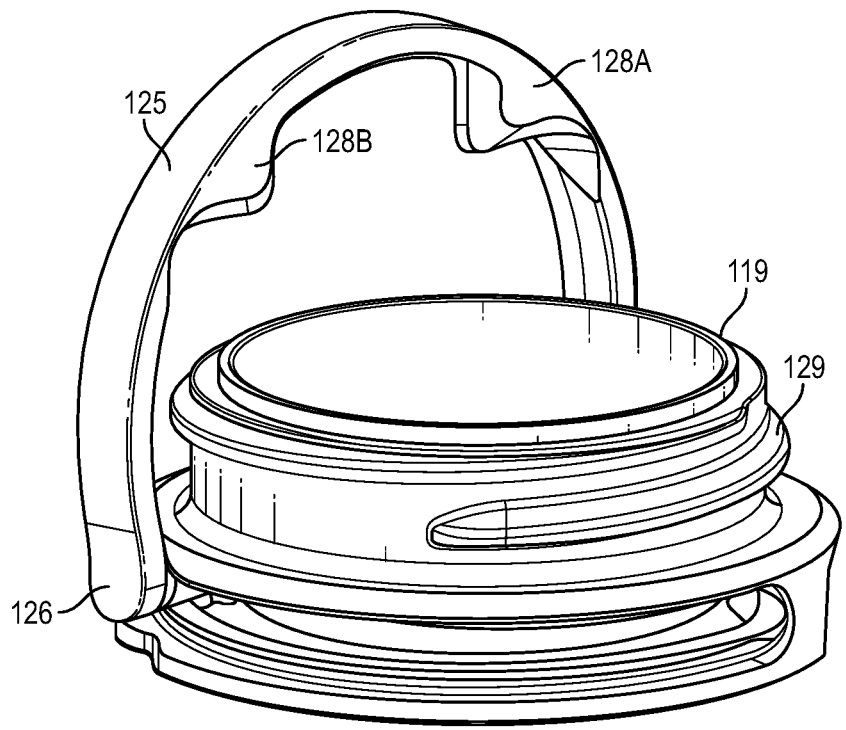

At this extended position with the flared pin 124A at the other end of the slot 127, the handle 125 can be rotated upward, stretched, and snapped over the cap 110 to the locking position, as shown in FIG. 7C. It will be understood that, for simplicity, FIGS. 7A-7C show the collar 120 alone, without the cap 110 and tube 130. FIG. 3 shows that an imaginary axis X is formed by the pins 123A, 124A. The handle 125 can be rotated about the imaginary axis X formed by the pins 123A, 124A. To unlock the bail 122, the handle 125 is rotated in the opposite direction and downward from the position shown in FIG. 7C to the extended position shown in FIG. 7B. To move the bail 122 back into the nested position, as shown in FIG. 7A, the bail 122 is pushed in a direction opposite of the direction shown by arrow A. Thus, if the handle 125 is rotated in clockwise direction to the locked position, the handle 125 is rotated in a counterclockwise direction to an unlocked position. Similarly, if the handle 125 is rotated in a counterclockwise direction to the locked position, the handle 125 is rotated in a clockwise direction to an unlocked position.

The locking bail 122 can also serve as a handle by which the travel tube 100 can be held or hooked to attach to another item, such as a lanyard, carabiner, hook, bag or backpack. When not in use as a handle or for locking the cap 110 in a closed position, the locking bail 122 can be retracted into a nested position such that the bail 122 is substantially flush with the surface of the collar 120. FIG. 7A shows the locking bail 122 in an unlocked, nested position, with its handle 125 nested within the slot 127 in the collar 120. In the nested position, the tooth 128A fits within correspondingly shaped recess 121 and tooth 128B fits within the slot 127 such that the outer surface of the handle 125 is substantially flush with outer surface of the collar 120. As noted above, the curvature of the handle 125 corresponds to the curvature of the collar 120.

According to an embodiment, to move the locking bail 122 from a locked position, as shown in FIGS. 6A and 6B, to an unlocked, nested position as shown in FIGS. 1 and 7A, a user pushes the handle 125 in a direction away from the hinge 112 to disengage the teeth 128A, 128B from the top of the cap 110. As noted above, the bail 122 is in a locked position with the handle 125 and the teeth 128A, 128B over the top surface of the cap 110. It will be noted that when the handle 125 is simply rotated upward, the bottom surfaces of the teeth 128A, 128B do not clear the top surface/lip of the cap 110. In an embodiment, the teeth 128A, 128B are chamfered on the side facing the center of the tube 100 when in the locked position. This chamfered face helps the teeth 128A, 128B slide over the top of the cap as additional force is needed to stretch the handle 125 a bit to push the bottom surfaces of the teeth 128A, 128B over the lip of the top surface of the cap 110. The opposite sides of the teeth 128A, 128B are not chamfered to prevent the bail 122 from unlocking. Thus, in this embodiment, more force is required to unlock the bail 122 than is required to lock the bail 122. As noted above, the teeth 128A, 128B can also bend to allow the teeth 128A, 128B to pass up and over the edge of the cap 110. It can be a combination of the bail 122 stretching and/or the teeth 128A, 128B bending that allows the teeth 128A, 128B to slide up and over the edge of the cap 110.

The ball and socket joint 123 allows both the rotation of pin 123A and the translation of the pin 124A from one end of the slot 127 to the other end of the slot 127 as well as the rotation of the handle 125 about the imaginary axis X.

Figure 7D:
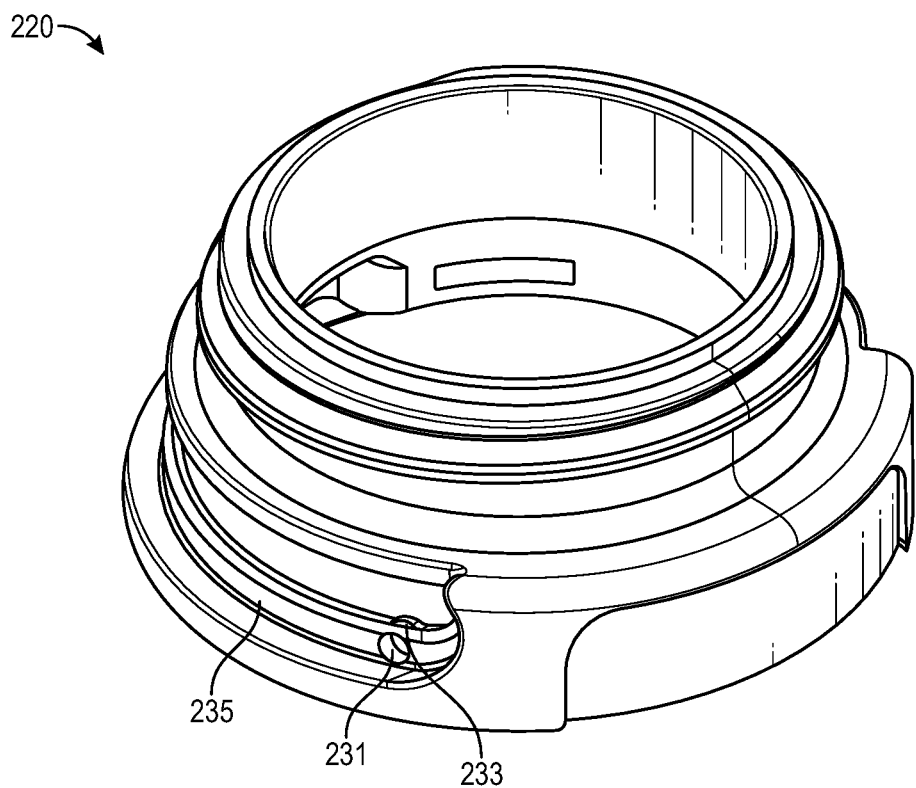
FIG. 7D shows the collar in accordance with another embodiment.

FIG. 7D shows another embodiment of a collar 220. In the embodiment shown in FIG. 7D, the collar 220 is provided with a retention feature for retaining the locking bail 122 in the nested position to prevent accidental un-nesting of the handle 125. In the embodiment shown in FIG. 7D, the collar 220 has a lower wall 235 within the recessed slot 227. The lower wall 235 is recessed and the slot 227 above the lower wall 235 is open. In the illustrated embodiment, the retention feature includes an opening, such as a hole 231, in the lower wall 235 of the collar 220 as well as a corresponding protrusion or bump 233 on the top surface or rim of the lower wall 235. As illustrated in FIG. 7D, the hole 231 extends through the thickness of the lower wall 235, from one side surface of the lower wall 235 to the other side surface of the lower wall 235.

As shown in FIG. 7D, the bump 233 is positioned over the hole 231 and provides a snap detent when the handle 125 is in the nested position. When the handle 125 is in the nested position, the bump 133 retains the handle 125 in the nested position. The hole 131 allows the bump 133 to flex a bit and then snap back into place when the handle 125 is intentionally pushed out of the nested position by a user. In other embodiments, the retention feature includes only a bump 133 (and no hole in the lower wall 235) for retaining the handle 125 in the nested position. In still other embodiments, the retention feature can include more than one bump 133. For example, a second bump can be positioned on the top surface of the lower wall to retain the handle 125 in the fully pushed back position (as shown in FIG. 7B).

Figure 8:
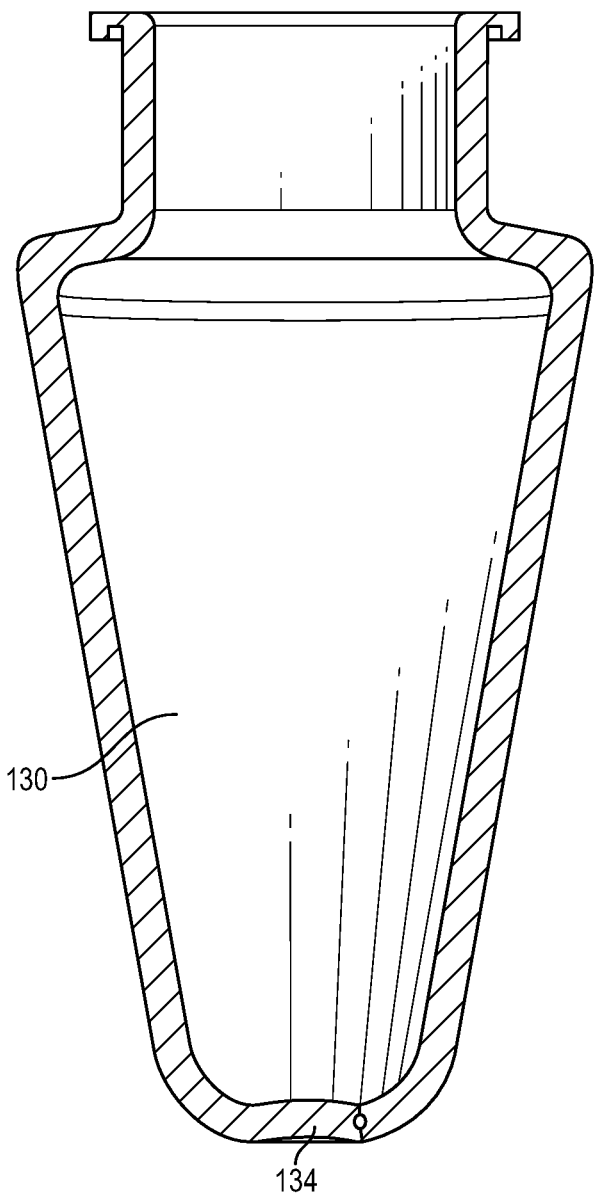
FIG. 8 is a side view of an embodiment of the travel tube.

FIG. 8 is a side view of the tube portion 130. As shown in FIG. 8, there is a concave, slightly dished end 134 on the bottom surface. The slightly dished end 134 allows the travel tube 100 to stand on this end. It will be understood that the travel tube 100 is capable of standing either on the cap 110 or on the slightly dished end 134. Standing the travel tube 100 on the slightly dished end 134 is especially useful when filling and refilling the travel tube 100.

Although only a few embodiments of the invention have been described in detail, it should be appreciated that the invention may be implemented in many other forms without departing from the spirit or scope of the invention. In view of all of the foregoing, it should be apparent that the present embodiments are illustrative and not restrictive and the invention is not limited to the details given herein, but may be modified within the scope and equivalents of the appended claims.

What is claimed is:

1. A reusable travel tube, comprising:
a flexible tube portion having a neck with a flange;
a collar that fits over and surrounds the neck of the flexible tube portion, wherein the flange fits over a top rim of the collar, the collar including a rotatable locking bail; and
a cap configured to be screwed onto the collar via a threaded portion of the collar; and
wherein the rotatable locking bail is configured to prevent the cap from opening when the rotatable locking bail is in a locked position, the rotatable locking bail including a curved handle attached to the collar by a ball and socket joint at a first end and a pin joint at a second end, wherein the pin joint is slidable along a slot in a side wall of the collar.

2. The reusable travel tube as recited in claim 1, wherein the handle comprises a pair of teeth extending from the handle and the cap is a flip-top cap.

3. The reusable travel tube as recited in claim 2, wherein each of the teeth has a chamfered edge.

4. The reusable travel tube as recited in claim 3, wherein when the rotatable locking bail is rotated over the cap, the chamfered edge moves over an edge of a top surface of the cap.

5. The reusable travel tube as recited in claim 1, wherein the slot comprises a lower wall having a bump on a top surface of the lower wall.

6. The reusable travel tube as recited in claim 5, wherein an opening extends from a first side surface of the lower wall to a second side surface of the lower wall.

7. A reusable travel tube comprising:
a flexible tube portion having a neck with a flange;
a collar that fits over and surrounds the neck of the flexible tube portion, wherein the flange fits over a top rim of the collar, the collar including a rotatable locking bail; and
a cap configured to be screwed onto the collar via a threaded portion of the collar; and
wherein the rotatable locking bail is configured to prevent the cap from opening when the rotatable locking bail is in a locked position, wherein the rotatable locking bail can be switched between a nested position and the locked position, wherein the locking bail has a curved handle that is substantially flush with an outer side wall of the collar in the nested position.

8. The reusable travel tube as recited in claim 7, wherein the curved handle comprises a pair of teeth extending from the handle and wherein the curved handle can be rotated over the cap with at least one of the teeth abutting a top surface of the cap.

9. The reusable travel tube as recited in claim 8, wherein the at least one of the teeth has a chamfered edge.

10. The reusable travel tube as recited in claim 9, wherein at least one of the teeth is received within a recess in the collar in the nested position.

11. The reusable travel tube as recited in claim 1, wherein the flange is substantially perpendicular to a side wall of the neck.

12. The reusable travel tube as recited in claim 11, further comprising a tooth extending downward from the flange, wherein a side wall of the tooth is substantially parallel to the side wall of the neck.

13. The reusable travel tube as recited in claim 12, wherein the top rim of the collar fits within a void formed by the flange, the tooth, and the side wall of the neck.

14. A cap system for use with a reusable travel tube, the cap system comprising:
a collar that fits over and surrounds the neck of the reusable travel tube, the collar comprising a rotatable locking bail; and
a flip-top cap configured to be screwed onto the collar via a threaded portion of the collar, the rotatable locking bail for preventing the flip-top cap from opening, wherein the rotatable locking bail can be switched between a nested position and a locked position, wherein the locking bail has a curved handle that is substantially flush with an outer side wall of the collar in the nested position.

15. The cap system as recited in claim 14, wherein the locking bail comprises a curved handle attached to the collar by a ball and socket joint at a first end and a pin joint at a second end, wherein the second end is slidable along a recessed slot in a side wall of the collar.

16. The cap system as recited in claim 15, wherein the recessed slot comprises a lower wall having at least one bump on a top surface of the lower wall and wherein an opening extends from a first side surface of the lower wall to a second side surface of the lower wall.

17. The cap system as recited in claim 14, wherein the curved handle comprises at least one tooth having a chamfered edge, the at least one tooth extending from the handle and wherein the curved handle can be rotated over the cap with the chamfered edge abutting a top surface of the cap.

18. A cap system for use with a reusable travel tube, the cap system comprising:
a collar that fits over and surrounds the neck of the reusable travel tube, the collar comprising a rotatable locking bail; and
a flip-top cap configured to be screwed onto the collar via a threaded portion of the collar; and
wherein the rotatable locking bail includes a curved handle attached to the collar by a ball and socket joint at a first end and a pin joint at a second end, wherein the pin joint is slidable along a slot in a side wall of the collar, the rotatable locking bail.

19. The cap system as recited in claim 18, wherein the handle further comprises a pair of teeth extending from the handle, the teeth being arranged to engage a top portion of the flip-top cap when the rotatable locking bail is in a locked position to hold the flip to cap closed.

20. The cap system as recited in claim 18 wherein the rotatable locking bail can be switched between a nested position and the locked position.

* * * * *